July 22, 1969     D. N. W. BADCOCK     3,456,743

PORTABLE POWER TOOLS

Filed April 29, 1968     2 Sheets-Sheet 1

DAVID NORMAN WILLIAM BADCOCK
INVENTOR

By, Wenderoth, Lind & Ponack.
attys

United States Patent Office 3,456,743
Patented July 22, 1969

3,456,743
PORTABLE POWER TOOLS
David Norman William Badcock, Streatham, London, England, assignor to Kango Electric Hammers Limited, London, England, a British company
Filed Apr. 29, 1968, Ser. No. 725,036
Claims priority, application Great Britain, May 4, 1967, 20,885/67
Int. Cl. E21b 1/00; B25d 9/00; B27c 3/08
U.S. Cl. 173—117    7 Claims

ABSTRACT OF THE DISCLOSURE

In a portable tool such as an electric hammer, the handle of the tool is provided by a one-piece moulding made from an electrically insulating material and provides compartments for the motor switch and the cable entry assembly and a substantial recess for the gearbox through which the drive from the motor to the tool holder is transmitted. The handle and the motor carry interengaging plug and socket elements for conveying the current from the motor switch to the motor, and these elements are engaged with and disengaged from each other by the acts of inserting and removing the motor from the external casing of the tool.

---

This invention relates to portable power tools and more particularly relates to portable power tools of the kind (hereinafter termed the kind referred to) having a main casing, an electric motor housed in the casing, a tool holder carried by the casing, gear means for transmitting a drive from the motor to said tool holder which gear means is housed in a gear casing on the end of the main casing remote from the tool holder, a cable entry assembly for the current input to the motor, a switch electrically connected between the conductors of the cable entry assembly and the motor, means for operating the switch, and a hand grip which is secured to the main casing. The invention has a particularly useful but not exclusive application in double-insulated electric hammers and drills.

According to this invention there is provided a portable power tool of the kind referred to wherein the hand grip is part of a one-piece rubber or plastics moulding carrying the cable entry assembly, the motor switch and manually-operable means for actuating the switch, and provinding a substantial recess enclosing said gear casing.

According to a preferred feature of the invention, the gear casing and the gear means housed therein are constructed as a unit which is detachable from the main housing, and which is capable of assembly and adjustment before it is attached to the main housing.

According to another preferred feature of the invention, the electrical connections between the switch and the motor comprise interengaging pins and sockets, the arrangement being such that the pins and sockets become engaged and disengaged by the respective acts of placing the moulding on and removing the moulding from the main casing.

According to yet another preferred feature of the invention, the switch incorpoartes an actuating element and return spring means.

One embodiment of the invention will now be described by way of example with reference to the accompanying drawings, in which.

Figures 1, 3:
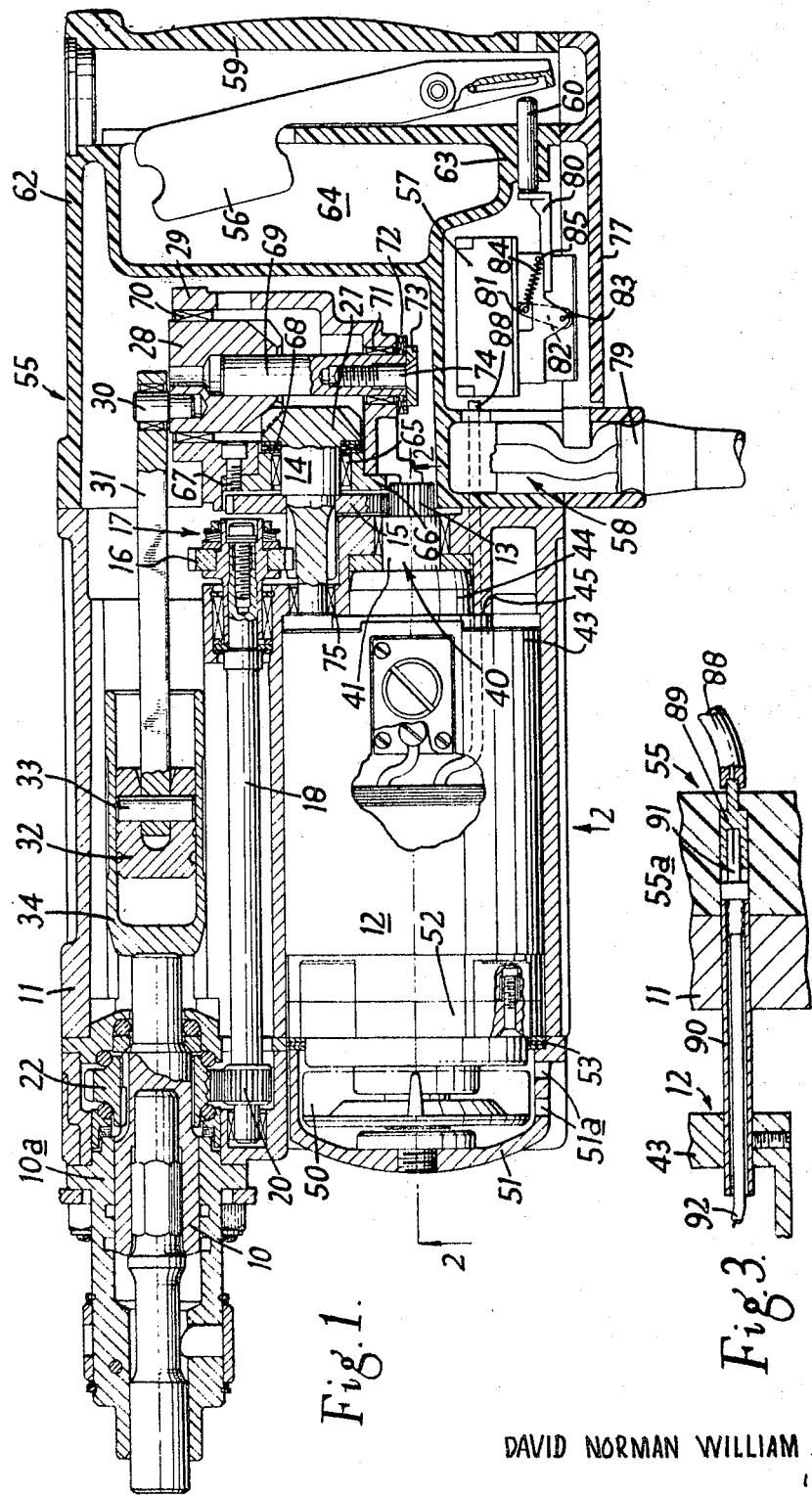
FIGURE 1 is a sectional elevation of a portable hammer.
FIGURE 3 is a fragmentary sectional elevation showing a detail.

Referring to the drawings, the tool comprises a tool holder 10 which is journalled in a housing 10a secured to one end of the main casing 11 of the tool and which is reciprocable lengthwise of itself and rotated by an electric motor 12 mounted in the casing 11 with its shaft parallel to the axis of rotation of the tool holder.

The rotational and reciprocating drives to the tool holder are transmitted from gear teeth 13 formed on the output element of a coupling 40 secured on the motor output shaft to a meshing gear wheel 15 mounted on a lay shaft 14. At one end lay shaft 14 has integral gear teeth meshing with a pinion 16 which drives, through a clutch unit 17, a shaft 18 mounted in bearings in the main casing 11 and extending parallel to the shaft of motor 12. At its opposite end, shaft 18 carries a pinion 20 meshing with external gear teeth on a hub 22 which is splined internally and which is mounted in bearings in the main casing 11 and tool holder housing 10a. Tool holder 10 extends through the hub 22 and has external splines cooperating with the splines in the hub so as to be rotatable with but slidable axially relative to the hub.

Lay shaft 14 has also formed integrally with it a bevel gear 27 which meshes with a bevel gear 28 journalled in a housing 29 secured to the rear end of the main casing 11. The end of bevel gear 28 remote from the lay shaft projects from the housing 29 and carries an eccentric pin 30 to which one end of a connecting rod 31 is coupled. A piston 32 is secured by a gudgeon pin 33 on the other end of connecting rod 31 and is slidably mounted in an outer piston 34 which is arranged to impact on the tool holder 10 and which is mounted in a slideway in the main casing 11. Pistons 32 and 34 together form a pneumatic coupling for transmitting impacts from the connecting rod 31 to the tool holder 10. The construction and arrangement of this coupling is described in more detail in our Patent No. 3,334,693.

Figure 2:
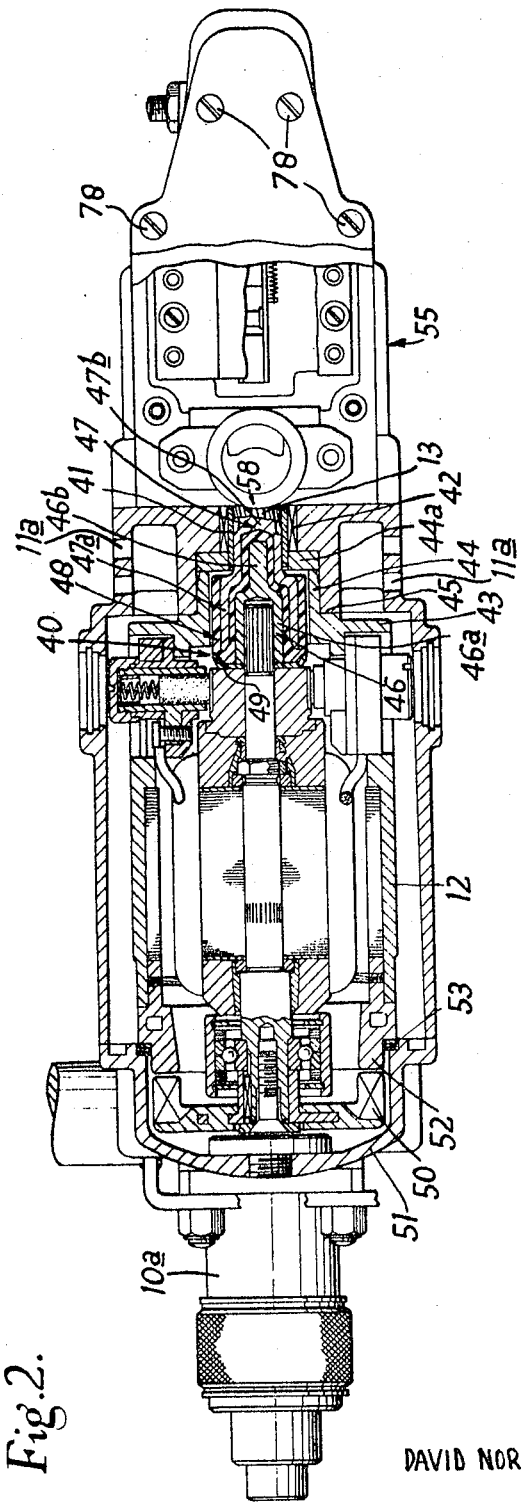
FIGURE 2 is an inverted plan of the hammer, partly sectioned on the line 2—2 of FIGURE 1.

Coupling 40 is an electrically insulating coupling. Referring to FIGURE 2, the coupling includes an input element 46, an output element 47, and an electrically insulating element 48 which is moulded about portions of elements 46 and 47 and drivingly couples them together. Element 46 has a hollow portion 46a which is an interference fit on a splined end portion of the motor shaft, and a solid extension 46b. Element 47 has a sleeve portion 47a which encircles part of the axial length of portion 46a, and a hollow shaft portion 47b which encircles extension 46b and which has gear teeth 13 formed on its free end portion. Elements 46 and 47 are not in direct contact with each other at any point and the moulded insulating element 48 fills the gaps between them. Element 48 may conveniently be made from glass-filled nylon. The shaft portion 47b of the output element 47 has secured on it a hardened steel sleeve 41 which is carried in bearings 42 in the main casing 11. The motor has no internal bearing for this end of its output shaft, and bearing 42 therefore forms a main journal for the motor shaft. The end plate 43 of the motor adjacent bearing 42 has a spigot portion 44 which is a close fit in a recess in the end wall of the main casing 11, and has a shoulder 45 which abuts this end wall 11 axially. A sealing member 44a is disposed axially between spigot portion 44 and the end of the recess and sleeve 41. An insulating shroud ring 49 encircles the motor shaft between the commutator and coupling 40.

Motor 12 together with coupling 40 at one end of its output shaft and a cooling fan 50 secured on the other end of its output shaft can be removed from the casing 11 axially through a large aperture which is normally closed by a domed cover 51. Cover 51 forms part of the main casing and is secured in position by screws (not shown) which are readily removable to allow removal of the cover. Motor 12 has at its end nearer cover 51 a bearing holder 52 having a reduced diameter portion on which is disposed a set of resilient waved washers 53. Washers 53 are accommodated over a major portion of their periphery in a shallow recess in the cover 51, so that as the fixing screws of the cover are tightened washers 53 come into abutment with the shoulder formed on the bearing holder 52 by the reduction of diameter and urge the shoulder 45 on the end plate 43 resiliently into engagement with the end wall of the man casing. Fan 50 draws air into the motor through parts 11a in the external casing 11 and ports in the motor end plate. The air leaves the motor through apertures in the bearing holder 52 and apertures 51a in the cover 51.

Motor 12 is held against radial shifting within the casing by six concavely faced ribs (not shown) which are formed internally of the main casing and which project radially into engagement with the cylindrical external surface of the motor housing. The ribs are spaced evenly about the lengthwise axis of the motor.

The motor thus constitutes a unitary component of the tool and can be removed for servicing or repair and re-inserted, or, if desired can be replaced by a similar motor or by a motor having the same overall dimensions but, say, a different power output. Another advantage of this arrangement is that since the reduction gear train and box and the tool holder do not need to be disturbed in order to remove and replace the motor, the motor can be fully assembled and bench tested independently of the other parts of the tool, so that the manufacture and assembly of the tools is rendered more flexible. In addition, the disposition of the motor cooling fan 50 within the motor compartment of the external casing means that the fan can be disposed outside the motor housing part and still be protected. Also the enclosure of the motor within the external casing enables the motor housing part to be made from insulating plastics material without the need for incorporation of metal reinforcement in the housing material.

Bevel gears 27 and 28 are so mounted in their housing 29 to form a unit which is detachable as such from the main casing 11. Bevel gear 27 and lay shaft 14 are supported by a roller bearing 65 in a bearing ring 66 which is secured to the housing 29 by screws 67 and forms part of the unit. A thrust bearing 68 is disposed between the rear surface of bevel gear 27 and the inner end of bearing ring 66. Bevel gear 28 is secured to a shaft 69, and roller bearings 70, 71 support this assembly in the housing 29. In addition, a thrust bearing 72 is mounted between an external surface of housing 29 and a thrust ring 73 which is secured to the end of shaft 69 by a screw 74. The mesh of the bevel gears is thus controlled by the thrust bearings, and adjustment of the unit can be made, by means of shims interposed between housing 29 and the thrust bearing 72, to provide the correct mesh before the unit is attached to the main casing by screws which are not shown. A bearing 75 supports the free end of lay shaft 14 and when the unit is attached to the main casing.

A handle moulding 55 is moulded in one piece from an electrically-insulating plastics material such as glass-filled nylon and is secured to the main casing 11. Moulding 55 provides a compartment accommodating the housing 29 and bevel gear assembly, and separate compartments for a switch lever 56, switch 57 and cable entry assembly 58 for the current supply to the motor. This ensures electrical safety and provides a simple construction in that no separate insulating liners are required. These compartments are formed by respective recesses in moulding 55. The switch compartments are closed off by a closure plate 77 secured by screws 78 to the moulding. The assembly 58 includes a grommet 79 and holder and is secured to the handle moulding 55 so as to close off the cable entry assembly compartments. The holder includes a transverse clamping bar portion, secured by screws (not shown) for preventing the cable and grommet from slipping.

The switch operating lever 56 is pivotally mounted within a hollow grip portion 59 of the moulding 55 which is connected to the main part of the moulding by two strut portions 62, 63. The head end of lever 56 projects through an opening in the wall of the grip 59 into the hand aperture 64 and the tail end of the lever operates the sliding actuating element 80 of switch 57 through a push rod 60 slidably mounted in a bore formed in the strut portion 63 and projecting into the separate compartment in which the switch is disposed. One end of element 80 is pivotally connected by a pin 81 to a toggle element 82 which is pivotally mounted at 83 on the fixed body of the switch. The toggle element is moved firmly into its two end positions by a toggle spring (not shown) in the usual manner. A pair of powerful tension springs 84 are connected between the ends of pin 81 and anchorages 85 on the body of the switch. Springs 84 are sufficiently strong to overcome the toggle spring and to return the toggle arm to the "off" position and the element 80, push rod 60 and lever 56 firmly to their rest position when manual pressure on lever 56 is released. This provides an extremely compact and efficient spring return system for the manual operating means for the switch.

The input leads of the cable entry assembly 58 are connected to the motor terminals through switch 57. Referring to FIGURE 3, the leads 88 from the switch are connected to respective socket elements 89 mounted in a front wall portion 55a of moulding 55. Two stiff insulating sleeves 90 mounted in the end plate 43 of the motor project through apertures in the main housing 11 and carry at their ends plug elements 91 which engage in the respective socket elements 89. Flexible conducting leads 92 extend through the sleeves 90 from the plug elements and have their opposite ends connected to the coil windings. The sleeves 90 serve to locate the motor circumferentially relative to the housing. It will be understood that the acts of removing and replacing the motor in the casing and/or removing and replacing the moulding 55 move the plug and socket elements out of and into engagement with each other. Assembly of the tool and changing of the motor in the manner previously mentioned is thus greatly facilitated. The necessity for removal of closure plate 77 to enable the conductors to be released from the switch terminals prior to removal of the handle moulding is therefore avoided in this construction.

In a slightly modified construction, not illustrated, the length of the spigot portion 44 is increased and the bearing 42 and the sealing member 44a are carried in the spigot portion. The sealing member 44a for sealing the shaft is in this case disposed between the end face of sleeve portion 47a and bearing 42 and acts on sleeve portion 47a. This arrangement requires greater accuracy in manufacture but the use of a separate pinion portion enables the part formed with gear teeth 13 to have any diameter up to the outside diameter of the spigot portion 44.

The illustrated tool is double-insulated, that is to say that there are two independent electrically insulating barriers between each of the current carrying components of the motor and the external casing of the tool. The commutator is insulated from the motor shaft in the normal manner, but additionally the motor shaft is insulated from the external casing. Thus shroud ring 49 and coupling 40 insulate the motor shaft from the end plate 43 of the motor housing part and from the reduction gears. Also, the opposite end of the motor shaft is carried in a bearing supported by the front bearing holder 52 of the motor housing part, which in this construction comprises a central metal boss having radial spokes which are embedded in the respective inward spokes of an outer insulating part, so that this end of the shaft is insulated from the external casing 11 by this outer insulating part. The end plate 43 and the axially extending parts of the motor housing part are moulded integrally with each other from a plastics electrically insulating material so that the housing part forms a second insulating barrier between the field coils of the motor and the external casing 11, the first insulating barrier being provided by the normal insulating wrappings on the coils. It will be understood that an insulating coupling similar to coupling 40 will be provided on the forward end of the motor shaft if the shaft drives at its forward end a member mounted in the external casing.

I claim:

1. A portable power tool having a main casing, an electric motor housed in the casing, a tool holder carried by the casing, gear means for transmitting a drive from the motor to said tool holder which gear means is housed in a gear casing on the end of the main casing remote from the tool holder, a cable entry assembly for the current input to the motor, a switch electrically connected between the conductors of the cable entry assembly and the motor, means for operating the switch, and a hand grip which is secured to the main casing, wherein the hand grip is part of a one-piece rubber or plastics moulding carrying the cable entry assembly, the motor switch and manually-operable means for actuating the switch, and providing a substantial recess enclosing said gear casing.

2. A portable power tool as claimed in claim 1, wherein the gear casing and the gear means housed therein are constructed as a unit which is detachable from the main housing and which is capable of assembly and adjustment before it is attached to the main housing.

3. A portable power tool as claimed in claim 1, wherein the electrical connections between the switch and the motor comprise interengaging pins and sockets, the arrangement being such that the pins and sockets become engaged and disengaged by the respective acts of placing the moulding on and removing the moulding from the main casing.

4. A portable power tool as claimed in claim 1, wherein the switch incorporates an actuating element and return spring means adapted to move the actuating element to its "off" position, which spring means acts to return the whole of the manually operable means to a rest position.

5. A portable power tool as claimed in claim 4, wherein the switch is a toggle switch and comprises a body, a toggle arm and a toggle spring for snapping the toggle arm into its two end positions, the toggle arm and toggle spring being mounted in the body, the actuating element being connected to operate the toggle arm, said spring being connected between the toggle arm and the body for resiliently returning the toggle arm from the "on" to the "off" position against the force of the toggle spring.

6. A portable power tool as claimed in claim 4, wherein the manually operable means comprises a lever pivotally mounted on the moulding, and a plunger slidably mounted in the moulding and extending between the lever and the actuating element.

7. A portable power tool as claimed in claim 1, wherein the switch is accommodated in a recess in the moulding, which recess is closed off by a closure plate secured to the moulding.

References Cited

UNITED STATES PATENTS

| 1,346,893 | 7/1920 | Jackson | 173—162 X |
| 2,396,007 | 3/1946 | Happe | 173—170 |
| 2,430,527 | 11/1947 | Mitchell | 173—170 |
| 3,133,600 | 5/1964 | Hochreuter | 173—117 X |
| 3,203,490 | 8/1965 | McCarty | 173—117 X |
| 3,294,182 | 12/1966 | Filander | 173—170 X |

NILE C. BYERS, JR., Primary Examiner

U.S. Cl. X.R.

173—170